UNITED STATES PATENT OFFICE 2,340,650

VULCANIZATION OF RUBBER

Russell T. Dean, Stamford, Conn., assignor to American Cyanamid Company, New York, N. Y., a corporation of Maine No Drawing. Application December 31, 1941,
Serial No. 425,234

12 Claims. (Cl. 260—793)

This invention relates to the vulcanization of rubber and more particularly to a method of accelerating the vulcanization of rubber by the use of compounds constituting a new class of accelerators.

The vulcanization accelerators of the invention are characterized by the presence of substituent ether groups on alkyl radicals attached to the nitrogen atom of the dithiocarbamic acid molecule. The compounds may be represented by the formula

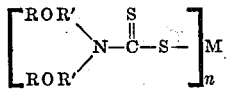

wherein R may be an alkyl, aralkyl or aryl group which may be the same or different. The alkyl group may be acyclic or cyclic. These radicals may contain substituents which do not change the essential character of the compound such as halogen atoms, nitro groups, hydroxy groups, etc. R' is an alkylene group which separates the oxygen atom from the nitrogen atom by at least two carbon atoms. This group may contain substituents of the kind described above in respect to the groups represented by R as well as aryl and substituted aryl radicals. R' may represent like or unlike alkylene radicals. M is a salt-forming group or an organic radical and $n$ is the valence of M.

In the above formula, M may be a heavy metal such as zinc, cadmium and lead, an alkali metal such as sodium and potassium or an alkaline earth metal such as calcium, barium and magnesium. It may be the ammonium radical or a salt forming group derived from the alkyl, aralkyl, aryl and heterocyclic amines, a guanidinium group derived from guanidine, diphenyl guanidine, diortho-tolyl guanidine, a pyridinium group, etc.

The dithiocarbamic acid derivatives constituting the vulcanization accelerators of the invention may be prepared by methods known to the art for the preparation of similar derivatives of similar dithiocarbamic acids. The various dithiocarbamic acids may be prepared in the form of their sodium salts by reaction of carbon disulfide, a secondary amine and sodium hydroxide in the presence of a suitable solvent. By employing ammonium hydroxide in place of the sodium hydroxide in this reaction, the corresponding ammonium dithiocarbamates may be prepared. By employing the sodium dithiocarbamate from the above reaction as one component of a double decomposition reaction, various other metal salts and organic nitrogen base salts of the dithiocarbamic acid may be obtained by the addition to a solution of the sodium dithiocarbamate of a salt of the desired metal or organic nitrogen base, e. g., the chloride or the hydrochloride respectively. As will be understood by those skilled in the art, the solvent employed in this double decomposition reaction should be preferably so selected that it is a solvent for only one of the reaction products, thus providing for selective separation of the same. Where the salt prepared is the dithiocarbamic acid salt of an organic nitrogen base, the solution containing the same may be concentrated under reduced pressure and the residue dried in vacuo to obtain the salt in its anhydrous form.

Any of the various salt-forming organic nitrogen bases can be employed in the foregoing manner for the preparation of accelerators falling within the scope of the invention, among which bases may be mentioned, for example:

| | |
|---|---|
| Methyl amine | Aniline |
| Dimethyl amine | N-ethyl aniline |
| Trimethyl amine | N-cyclohexyl aniline |
| Dibutyl amine | Toluidine |
| Cyclohexyl amine | Pyridine |
| Dicyclohexyl amine | Piperidine |
| Ethanolamine | Ditetrahydrofurfuryl amine |
| Diethanolamine | Morpholine |

The parent secondary amine salts of the dithiocarbamic acids are preferably prepared by reaction in known manner between one mol of carbon disulfide and two mols of the secondary amine, water or other suitable solvent being employed in the reaction.

The thiuram disulfides may be conveniently prepared by the oxidation of the sodium dithiocarbamate in aqueous solution with hydrogen peroxide containing sufficient sulfuric acid to neutralize the sodium hydroxide formed. The thiuram monosulfides may be prepared from the thiuram disulfides by desulfurizing the thiuram disulfide in alcoholic solution with a molecular equivalent of potassium cyanide.

The esters or other organic derivatives of the dithiocarbamic acids may be prepared by reaction of the sodium dithiocarbamate with a reactive halogen-containing compound such as ethyl bromide, benzoyl chloride, phosgene, acetyl chloride, benzyl chloride, chloracetone, carbamyl chloride, dimethyl carbamyl chloride, ethyl tolyl carbamyl chloride, diphenyl carbamyl chloride, dinitrochlorbenzene, picryl chloride, benzal chloride, ethyl chloracetate, ethyl dichloracetate, chloracetamide.

The secondary amines which may be employed for the preparation of the dithiocarbamic acid derivatives constituting the accelerators of the invention have the formula

wherein R and R' represent radicals identical with those described in the above general formula. Examples of the secondary amines are Bis (2-methoxy ethyl) amine
Bis (2-ethoxy-n-butyl) amine
Bis (2-ethoxy-n-amyl) amine
Bis (2-ethoxy n-hexyl) amine
Bis (2-ethoxy-(3'-methyl amyl)) amine
Bis (2-ethoxy-2-benzyl ethyl) amine
Bis (2-ethoxy-2-phenylethyl) amine
Bis (2-phenoxy ethyl) amine
Bis (2-β-naphthoxy ethyl) amine
Bis (2-p-methylphenoxy ethyl) amine
Bis (3-methoxy-n-propyl) amine
Bis (3-ethoxy-n-propyl) amine
Bis (3-isopropoxy-n-propyl) amine
Bis (3-n-butoxy-n-propyl) amine
Bis (3-(2'-ethylhexoxy)n-propyl) amine
Bis (3-octadecoxy-n-propyl) amine
Bis (3-phenoxy-n-propyl) amine
Bis (3-cyclohexoxy-n-propyl) amine
Bis (4-phenoxy-n-butyl) amine
Bis (3-(2'-ethoxyethoxy)-n-propyl) amine
Bis (3-(2'-ethylhexoxy)-isobutyl) amine The preparation of various derivatives of the dithiocarbamic acids is illustrated by the following examples,

EXAMPLE 1

ZINC BIS (3-ETHOXY PROPYL) DITHIOCARBAMATE 840 grams of 95% sodium hydroxide (20 mols) were dissolved in 16 liters of water and cooled to 17° C. by the addition of cracked ice. 3780 grams of bis (3-ethoxy propyl) amine (20 mols) were added and the mixture cooled to 17° C. 1520 grams of carbon disulfide (20 mols) were then added slowly with good stirring and the reaction mixture kept below 20° C. When the unreacted carbon disulfide was no longer perceptible, the solution containing the sodium dithiocarbamate was clarified and then cooled to 10° C. by the addition of cracked ice. The zinc salt was formed by slowly adding to the solution of the sodium salt, with good stirring, 1435 grams of 95% zinc chloride (10 mols) in eight liters of cold water. The zinc salt precipitated immediately and crystallization was aided by seeding with a previously prepared sample of the same material. The addition took about one half hour following which the mixture was stirred for an additional half hour and then filtered. The product was thoroughly washed with water, reslurried in ten liters of water, filtered and again washed with water, and dried for 24 hours at 40° C. The product, zinc bis (3-ethoxy propyl) dithiocarbamate, was a fine white powder with a melting point of 66–69° C. The analysis for zinc gave a value of 11.37% as compared to a theoretical value of 10.96%.

EXAMPLE 2

SODIUM BIS (3-ETHOXY PROPYL) DITHIOCARBAMATE 66 grams of bis (3-ethoxy propyl) amine and 28 grams of 50% sodium hydroxide were dissolved in 80 cc. of water and cooled to 5° C. 26.5 grams of carbon disulfide were added slowly with good stirring and the temperature of the reaction mixture kept below 25° C. When the carbon disulfide was no longer perceptible the solution was clarified. A solution of sodium bis (3-ethoxy propyl) dithiocarbamate of 50% concentration was thus obtained. The anhydrous form of the sodium salt may be obtained by concentrating the solution under reduced pressure and drying the residue in vacuo over concentrated sulfuric acid. The anhydrous product is a viscous balsam.

EXAMPLE 3

BIS (3-ETHOXY PROPYL) AMMONIUM BIS (3-ETHOXY PROPYL) DITHIOCARBAMATE 84 grams of bis (3-ethoxy propyl) amine were dissolved in 100 cc. of water and cooled to 5° C. 17 grams of carbon disulfide were added in small portions and the mixture well-stirred until clear, the temperature of the reaction mixture being kept below 25° C. The product was a 50% solution of the amine salt. The anhydrous form of the amine salt may be obtained by concentrating the solution under reduced pressure and drying the residue in vacuo over concentrated sulfuric acid. The anhydrous product is an orange balsam.

EXAMPLE 4

TETRAKIS (3-METHOXY PROPYL) THIURAM DISULFIDE

A solution of 81 grams of bis (3-methoxy propyl) amine in 200 cc. of water was cooled to 10° C. and 38 grams of carbon disulfide gradually added thereto. A cold solution of 20 grams of sodium hydroxide in 100 cc. of water was then added with good stirring. The temperature of the reaction mixture was kept below 10° C. After the liquid mixture became clear (one hour) the volume was increased to one liter by the addition of cold water and the resulting solution clarified. To this solution was added a cold mixture of 29 grams of 30% hydrogen peroxide, 109 grams of 22% sulfuric acid and 300 cc. of water over a period of one hour. The product separated as a light yellow oil which was washed well with water and desiccated in vacuo over concentrated sulfuric acid.

The product analyzed nitrogen 5.94% and sulful 26.75% as compared with the theoretical values of 5.93% and 27.11% respectively.

EXAMPLE 5

TETRAKIS (3-METHOXY PROPYL) THIURAM MONOSULFIDE

A mixture of 47 grams of tetrakis (3-methoxy propyl) thiuram disulfide, 6.5 grams of potassium cyanide and 200 cc. of ethyl alcohol was stirred at 45–50° C. for 2½ hours. The reaction mixture was clarified and evaporated to half volume under reduced pressure. At this point a solid believed to be potassium thiocyanate was filtered off and the evaporation completed. The resulting thick liquid was well-washed with water and desiccated in vacuo over concentrated sulfuric acid. The product was obtained as a dark red oil which was soluble in alcohol and ether but insoluble in water.

The product analyzed 6.30% nitrogen and 21.40% sulfur as compared to the theoretical of 6.36% and 21.82% respectively.

EXAMPLE 6

2.4 DINITROPHENYL BIS (3-METHOXY PROPYL) DITHIOCARBAMATE

A solution of sodium bis (3-methoxy propyl) dithiocarbamate was prepared by the interaction of 16 grams of bis (3-methoxy propyl) amine, 8 grams of carbon disulfide and 4 grams of sodium hydroxide in 275 cc. of ethanol at 25° C. It was clarified and heated to 50° C. A solution of 2,4 dinitrochlorbenzene in 200 cc. of ethanol was added dropwise with stirring over a period of ½ hour, the temperature being maintained at 45–55° C. After the reaction was complete, the solid which was believed to be sodium chloride was filtered off and the mother liquor evaporated to small volume under reduced pressure. The oil which separated was taken up in ether, and the ether solution washed with water and dried over anhydrous sodium sulphate. Removal of the ether in the usual manner gave the product in the form of a dark, viscous oil.

In general, the vulcanization accelerators of the invention have good solubility in rubber and for the most part are accelerators of the ultra type and therefore suitable for the vulcanization of latex.

The activity of the compounds as accelerators for the vulcanization of rubber was tested as follows.

Dry rubber mixes were prepared in accordance with the formula, parts being by weight.

| | |
|---|---|
| Smoked sheets | 100 |
| Stearic acid | 1 |
| Zinc oxide | 5 |
| Sulphur | 2.5 |
| Accelerator | 0.5 |

The samples were vulcanized in the usual manner. In the following table, A represents zinc bis (3-methoxy propyl) dithiocarbamate and B represents zinc bis (3-ethoxy propyl) dithiocarbamate.

TABLE I

| Accelerator | Cure | | Modulus at 500% | Tensile, lbs./sq. in. |
|---|---|---|---|---|
| | Temperature | Time | | |
| | °C. | Min. | | |
| A | 120 | 20 | 1,075 | 5,225 |
| | 105 | 30 | 660 | 4,575 |
| B | 120 | 20 | 900 | 4,850 |
| | 105 | 30 | 475 | 4,180 |

In a similar manner, tetrakis (3-methoxy propyl) thiuram disulfide and tetrakis (3-methoxy propyl) thiuram monosulfide were employed as accelerators in a dry rubber stock of the following formula in which parts are by weight.

| | |
|---|---|
| Smoked sheets | 100 |
| Stearic acid | 1 |
| Zinc oxide | 5 |
| Sulfur | 2.5 |
| Accelerator | 0.25 |

After vulcanization of the stocks in the usual manner, the vulcanizates were tested for Shore hardness with the results given in the following table, in which E denotes tetrakis (3-methoxy propyl) thiuram disulfide and F denotes tetrakis (3-methoxy propyl) thiuram monosulfide.

Press cure at 121° C.

| Time of cure in minutes | Shore hardness | |
|---|---|---|
| | Accelerator E | Accelerator F |
| 20 | No cure | No cure |
| 30 | 41 | 44 |
| 45 | 47 | 47 |
| 60 | 49 | 49 |

Latex sheets were prepared from the following formula, parts being by weight.

| | |
|---|---|
| Latex (62% solids) | 162 |
| Casein (10%) | 10 |
| Wetting agent | 1 |
| Zinc oxide dispersion (50%) | 2 |
| Sulfur dispersion (50%) | 3 |
| Water | 32 |
| Accelerator | See Table II |

The latex sheets were cured for 25 minutes at 100° in a current of hot air. In the following table of results, the accelerators denoted by A and B are zinc bis (3-methoxy propyl) and zinc bis (3-ethoxy propyl) dithiocarbamate respectively, C represents sodium bis (3-methoxy propyl) dithiocarbamate and D represents sodium bis (3-ethoxy propyl) dithiocarbamate.

TABLE II

| Accelerator | Parts | Modulus (500%) | Tensile strength |
|---|---|---|---|
| A | 0.75 | 500 | 4,270 |
| B | 0.75 | 580 | 4,200 |
| C (50% aqueous solution) | 1.50 | 1,770 | 4,355 |
| D (50% aqueous solution) | 1.50 | 1,480 | 4,520 |

Further illustrative of the invention are the following dithiocarbamates which were also tested and found to be accelerators of the vulcanization of rubber.

Zinc bis (2-methoxy ethyl) dithiocarbamate
Zinc bis (3-isopropoxy propyl) dithiocarbamate
Zinc bis (3-n-butoxy propyl) dithiocarbamate
Zinc bis (3-(2'-ethyl hexoxy) propyl) dithiocarbamate
Zinc bis (3-n-octadecoxy propyl) dithiocarbamate
Lead bis (3-methoxy propyl) dithiocarbamate
Lead bis (3-ethoxy propyl) dithiocarbamate
Cadmium bis (3-methoxy propyl) dithiocarbamate
Magnesium bis (3-methoxy propyl) dithiocarbamate
Barium bis (3-methoxy propyl) dithiocarbamate
Calcium bis (3-methoxy propyl) dithiocarbamate
Bis (3-methoxy propyl) ammonium bis (3-methoxy propyl) dithiocarbamate
Bis (3-ethoxy propyl) ammonium bis (3-ethoxy propyl) dithiocarbamate The accelerators of the present invention may be employed in accordance with known procedures for the vulcanization of rubber and the amounts thereof may be varied to meet individual requirements, as will be understood by those skilled in the art. The accelerators may also be used in conjunction with known accelerators where special results are desired. While, in general, the use of activators with the accelerators of the invention is not necessary, the usual activators, e. g. diphenylguanidine and di-orthotolyl guanidine, may be employed for activation of those members of the class which are of low activity.

The term "rubber" appearing in the specification and the claims is used in the generic sense and is intended to include not only natural rubbers but also sulfur-vulcanizable synthetic rubbers.

The accelerators of the present application are claimed as new chemical compounds in my copending application Serial No. 424,921, filed December 30, 1941. The amine salts as rubber vulcanization accelerators are more specifically claimed in companion application Serial No. 425,236, filed December 31, 1941.

While I have described certain specific embodiments of my invention, it is to be understood that the invention is not to be limited thereto but is to be restricted solely by the scope of the appended claims construed as broadly as is permissible in view of the prior art.

I claim:

1. A process of treating rubber which comprises vulcanizing it in the presence of an accelerator which is a dithiocarbamic acid derivative having the formula

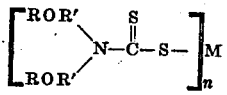

wherein R is an alkyl radical, R' is an alkylene radical which separates the oxygen atom from the nitrogen atom by at least two carbon atoms, M is a heavy metal, and $n$ is the valence of M.

2. A process of treating rubber which comprises vulcanizing a rubber mix containing a vulcanizing agent and zinc bis (2-methoxy ethyl) dithiocarbamate.

3. A process of treating rubber which comprises vulcanizing a rubber mix containing a vulcanizing agent and zinc bis (3-ethoxy propyl) dithiocarbamate.

4. A process of treating rubber which comprises vulcanizing it in the presence of an accelerator which is a dithiocarbamic acid derivative having the formula

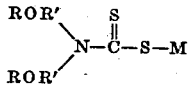

wherein R is an alkyl radical and R' is an alkylene radical which separates the oxygen atom from the nitrogen atom by at least two carbon atoms and M is an alkali metal.

5. A process of treating rubber which comprises vulcanizing it in the presence of an accelerator which is a dithiocarbamic acid derivative having the formula

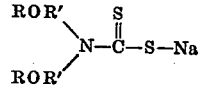

wherein R is an alkyl radical and R' is an alkylene radical which separates the oxygen atom from the nitrogen atom by at least two carbon atoms.

6. A process of treating rubber which comprises vulcanizing a rubber mix containing a vulcanizing agent and sodium bis (3-ethoxy propyl) dithiocarbamate.

7. A rubber product which has been vulcanized in the presence of a dithiocarbamic acid derivative having the formula

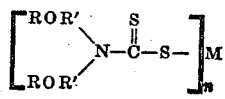

wherein R is an alkyl radical, R' is an alkylene radical which separates the oxygen atom from the nitrogen atom by at least two carbon atoms, M is a heavy metal, and $n$ is the valence of M.

8. A rubber product which has been vulcanized in the presence of a zinc bis (2-methoxy ethyl) dithiocarbamate.

9. A rubber product which has been vulcanized in the presence of zinc bis (3-ethoxy propyl) dithiocarbamate.

10. A rubber product which has been vulcanized in the presence of a dithiocarbamic acid derivative having the formula

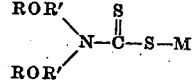

wherein R is an alkyl radical and R' is an alkylene radical which separates the oxygen atom from the nitrogen atom by at least two carbon atoms and M is an alkali metal.

11. A rubber product which has been vulcanized in the presence of a dithiocarbamic acid derivative having the formula

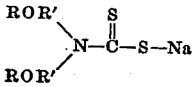

wherein R is an alkyl radical and R' is an alkylene radical which separates the oxygen atom from the nitrogen atom by at least two carbon atoms.

12. A rubber product which has been vulcanized in the presence of sodium bis (3-ethoxy propyl) dithiocarbamate.

RUSSELL T. DEAN.